June 4, 1968  W. HOPPE ET AL  3,387,079
PROCESS FOR THE FUSION OF METAL OXIDES
Filed Feb. 23, 1965
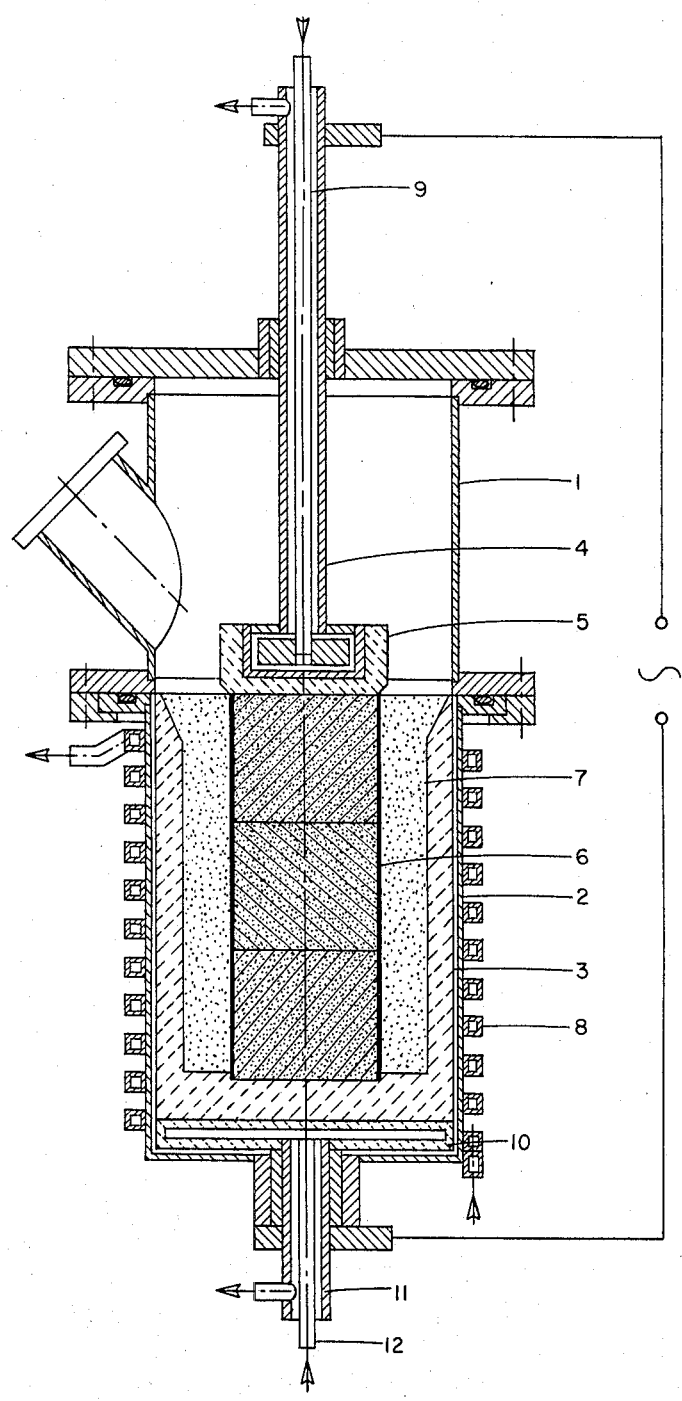

United States Patent Office 3,387,079
Patented June 4, 1968

3,387,079
PROCESS FOR THE FUSION OF
METAL OXIDES
Walter Hoppe, Grossauheim uber Hanau, Norbert Müller, Wolfang uber Hanau, and Wilhelm in der Schmitten, Hanau am Main, Germany, assignors to the United States of America as represented by the United States Atomic Energy Commission
Filed Feb. 23, 1965, Ser. No. 434,720
Claims priority, application Germany, Mar. 24, 1964, E 26,696
5 Claims. (Cl. 13—34)

ABSTRACT OF THE DISCLOSURE

Metal oxide compacts are placed in a furnace to form a column. The column of compacts is preheated until electrical conduction is established between the compacts. After preheating, the compacts are surrounded by a powder of the metal oxide to provide an insulation around the compacts. Diametrically opposed electrodes are employed to pass an alternating current through the compacts to fuse the compacts together.

---

This invention relates to a process and an apparatus for the fusion of metal oxides. More particularly, this invention relates to a process and apparatus whereby pressings of uranium dioxide powder are fused into slugs by electrical current applied directly to the uranium dioxide pressings.

Molten uranium dioxide has been used in nuclear technology for the production of vibration-compressed fuel elements. Generally, the fuel element was produced in an electric arc by the fusion of fine uranium dioxide powder. The high temperatures generated by the electric arc furnace produced certain inherent disadvantages and problems with respect to insulation, furnace construction, and power supply. The most serious disadvantage arose from the relatively high vapor pressure of the uranium dioxide at the temperatures at which the electric arc operates. There was a distinct tendency for uranium dioxide to vaporize at electric arc operating temperatures since they were considerably higher than the uranium dioxide fusion temperature.

This invention has overcome these disadvantages by applying electrical current directly to the uranium dioxide powder compacts. This process may be effected in a simply constructed furnace since the highest temperature attained would be no more than the fusion temperature of the uranium dioxide, i.e., about 2800° C. and the vaporization would be negligible.

Apparatus for carrying out our process may be seen from the accompanying drawing. The drawing shows a furnace lined with a refractory material and having two diametrically opposing electrodes connected to a source of alternating current. The furnace consists of a copper crucible 2 lined with graphite 3. Water cooling coils 8 are wrapped around the outside of the copper crucible to regulate the external furnace temperature and prevent damage to the crucible. A vacuum tight furnace casing 1 is fitted onto the copper crucible to seal the charge from the atmosphere and to support one of the electrodes. An upper graphite electrode 5 is screwed onto the lower end of a perpendicularly adjustable, insulated copper tube 4 which extends through the furnace casing. A lower graphite electrode 10 in contact with the furnace graphite lining is screwed onto the upper end of a stationary insulated copper tube 11 which extends through the furnace casing. Water cooled tubes 9 and 12 run the length of copper tubes 4 and 11 to prevent overheating during operation. The charge 6 consists of several uranium dioxide pressings stacked inside the graphite lined crucible. Natural isotope combinations as well as enriched $UO_2$ may be used for the charge material. Powdered uranium dioxide 7 is placed around compact charge to provide heat insulation.

Operation of the furnace is easily performed by workers in the art. Compacts of uranium dioxide powder which have been sized to less than the internal diameter of the graphite lined crucible are stacked in the furnace. The upper adjustable electrode is then lowered until contact is made with the top of the compacts. The furnace is then connected to a source of alternating current of 50 or 60 cycles and the compacts are heated to a red glow under a protective atmosphere of argon. After electrical conduct has been initially established from the upper adjustable graphite electrode through the uranium dioxide compacts to the graphite lining at the bottom of the crucible, powdered uranium dioxide is placed around the compacts to provide insulation. The furnace will not operate properly if the fusion process is started with the uranium dioxide powder sheath placed around the compacts. The electrical resistance of the uranium dioxide compacts is so high that the current is transmitted from the upper electrode across the top of the charge to the wall of the crucible. Thus, to insure proper electrical conductivity across the compacts, the process is started with only the compacts stacked in the crucible. The preliminary heating which is given to the compacts increases their temperature which will decrease the resistance. When the system has equalized to the point where the electrical conductivity will not be disturbed, the uranium dioxide powder is added to the void between the compacts and the crucible wall. After this addition is completed, the current to the furnace is increased sufficiently to achieve fusion. During the fusion process, the column of uranium dioxide pressings will soften and the height will diminish so that lowering of the upper electrode will be necessary to maintain continued current transmission.

The fusion process including the preliminary heating step lasts about an hour. Upon completion, the crucible is screwed off of the furnace casing and sealed with a blank flange to allow the fused material to cool in an argon or helium atmosphere. Another crucible can then be connected to the furnace casing and the fusion process can then be continued using the same apparatus.

EXAMPLE

An 8 to 10 kilogram charge of $UO_2$ compacts was stacked in a furnace crucible, and the crucible was attached to the furnace. The furnace electrodes were positioned to contact the stack of $UO_2$ compacts and under a protective atmosphere of argon, the compacts were heated to a red heat by means of an alternating current power supply across the electrodes. After the compacts were brought to red heat, the power supply was terminated and the argon gas was removed. The furnace was opened and a sheath of powdered uranium dioxide was quickly poured around the charge, after which the furnace was immediately resealed. After the furnace was refilled with the protective argon atmosphere, an alternating current of 15 to 20 kilowatts power was applied to the furnace for approximately one half hour whereupon the stack of compacts were fused into one solid piece.

While uranium dioxide has been the metal oxide most frequently given as an example, it should be obvious to those skilled in the art that this furnace can be used for the fusion of other metal oxide compacts. As has been pointed out in the foregoing description, natural isotope combinations of uranium dioxide, as well as enriched $UO_2$, may be used for the charge material. In addition, other metal oxides, such as plutonium dioxide, vanadium trioxide or zirconium dioxide to name a few, could be successfully fused in a furnace according to this invention.

It is to be understood that the apparatus and process herein set forth is presented for purposes of explanation and illustration and that various modifications of the said apparatus and process can be made without departing from the spirit and scope of the invention as defined in the appended claims.

We claim:
1. A process for the fusion of metal oxide compacts comprising:
   (a) placing a column of metal oxide compacts in a furnace having two diametrically opposed electrodes,
   (b) sealing the furnace and
   (c) placing the electrodes in intimate contact with the metal oxide compacts and
   (d) heating said compacts to red heat under a protective atmosphere,
   (e) opening said furnace and
   (f) quickly surrounding the compacts with powder of the metal oxide,
   (g) resealing the furnace, and
   (h) heating the compacts under a protective atmosphere by the application of a predetermined quantity of electrical power from an alternating current supply for a predetermined time to fuse the compacts.
2. The process of claim 1 wherein the metal oxide is uranium dioxide.

3. A process for the fusion of metal oxide compacts comprising:
   (a) placing a column of metal oxide compacts in a furnace having two diametrically opposed electrodes,
   (b) placing the electrodes in intimate contact with the compacts,
   (c) preheating the compacts under a protective atmosphere until electrical conduction is established between the electrodes,
   (d) substantially surrounding the compacts with a powder of the metal oxide,
   (e) heating the compacts under a protective atmosphere by means of an alternating current supply connected to the electrodes to fuse the compacts.
4. The process of claim 3 wherein the preheating is by means of an alternating current supply connected to the electrodes.
5. The process of claim 3 wherein the metal oxide is uranium dioxide.

References Cited
UNITED STATES PATENTS

| | | | |
|---|---|---|---|
| 2,599,779 | 6/1952 | Rajtora | 13—23 |
| 2,907,705 | 10/1959 | Blainey. | |

BERNARD A. GILHEANY, *Primary Examiner.*

R. N. ENVALL, JR., *Assistant Examiner.*